Dec. 29, 1959   S. H. RAYNER   2,918,729
BREAD HANDLING APPARATUS
Filed Jan. 6, 1956   2 Sheets-Sheet 1
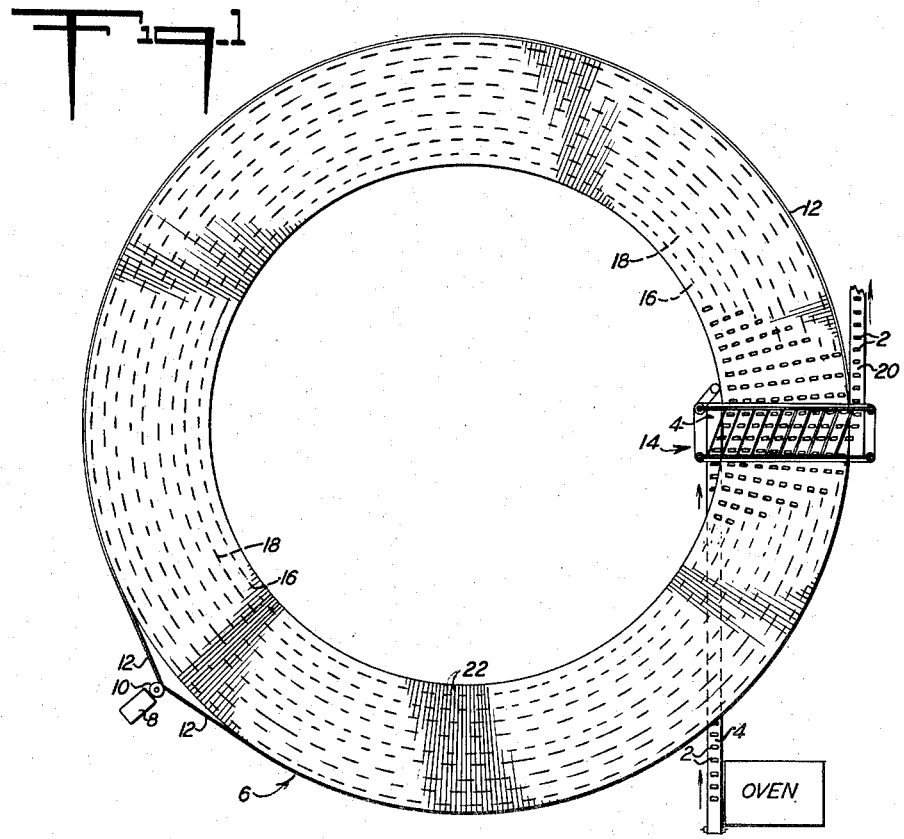
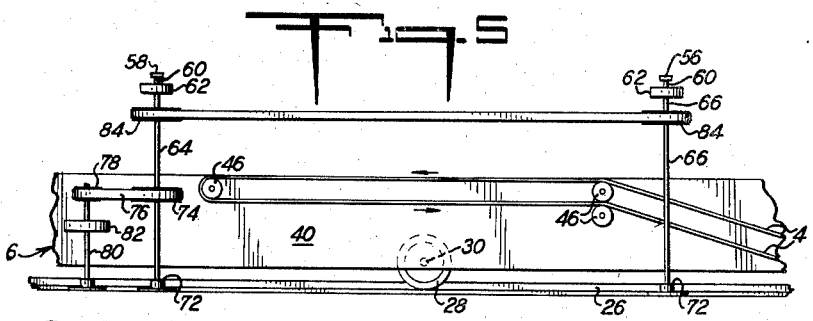
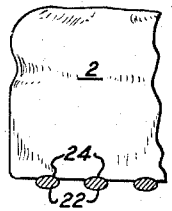
INVENTOR
STANLEY H. RAYNER
BY Swecker & Mathis
ATTORNEYS

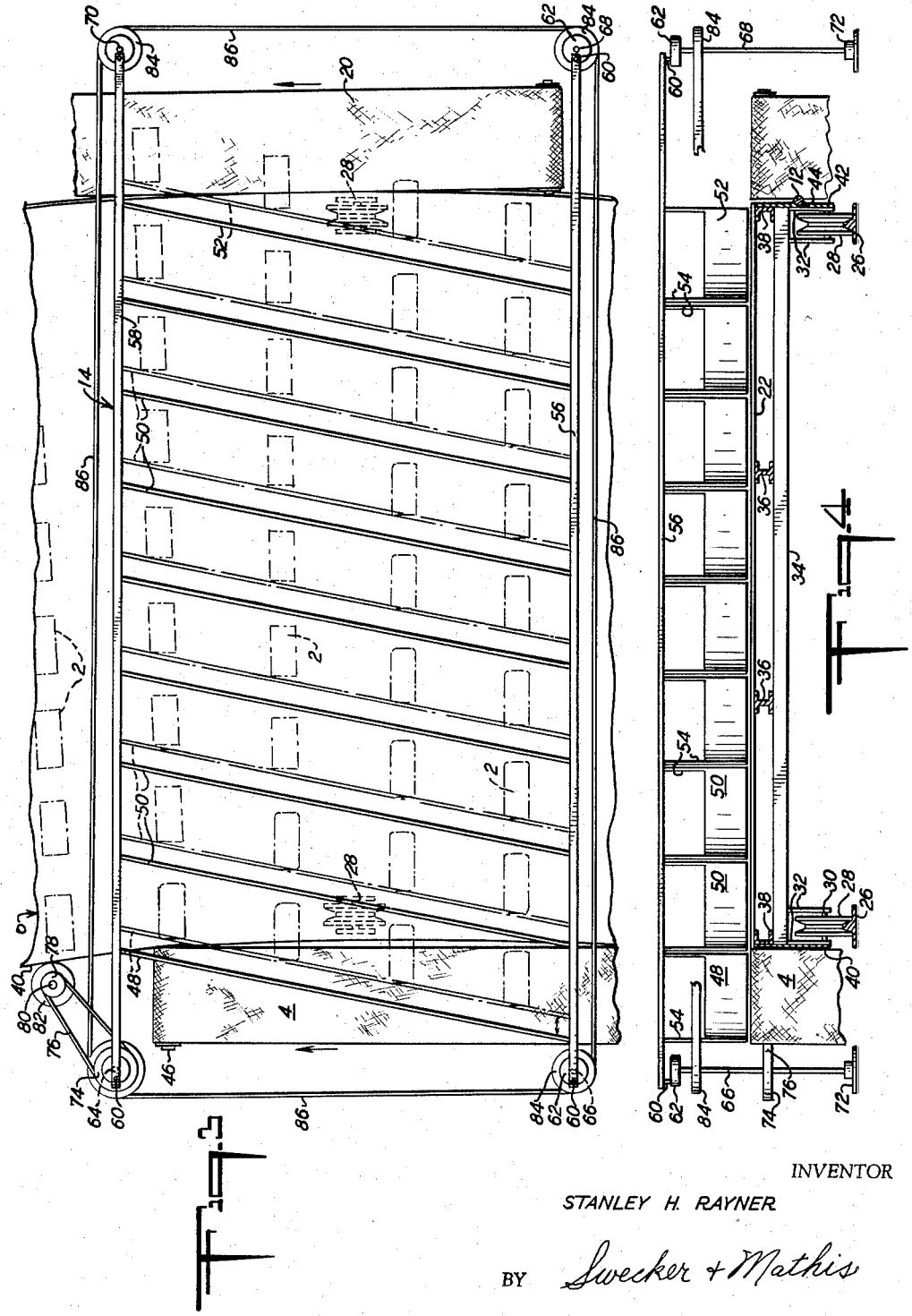

United States Patent Office 2,918,729
Patented Dec. 29, 1959

2,918,729

BREAD HANDLING APPARATUS

Stanley H. Rayner, Salisbury, Md.

Application January 6, 1956, Serial No. 557,714

9 Claims. (Cl. 34—184)

This invention relates to bread handling apparatus, and more particularly, to apparatus for passing warm, freshly baked loaves of bread from the oven of a bakery through an elongated path so that the loaves may cool sufficiently during their travel through such path to enable them to be wrapped.

In commercial baking operations it is usual to cool bread under atmospheric conditions for about one hour after it has been removed from the oven. During cooling it is necessary to store the loaves in some manner, and in most bakeries, this has been accomplished through the use of bread racks.

However, such racks are subject to several disadvantages. They must be stored when not in use, transferred to the zone of the oven, moved to some other zone where they will not be in the way during the period when the bread is cooling, and returned to storage after the bread has been removed. All these operations are time consuming, and the method requires a large amount of floor space.

Consequently, the desirability of an automatic bread cooling apparatus has heretofore been recognized in the art. However, all of the structures which have been proposed have been very complex and expensive, and they have not come into general use in the commercial baking field.

It is an object of this invention to provide simple and efficient apparatus for handling freshly baked loaves of bread during the cooling period.

A more specific object of this invention is to provide apparatus for passing each loaf of bread around an elongated, closed path a plurality of times. The closed path preferably is provided by an annulus, and each loaf makes a plurality of trips about the axis of the annulus, in paths of different radii.

Another object of this invention is to provide means for shifting loaves of bread laterally with respect to a conveyer which moves in a closed path, so that the loaves may traverse such path a plurality of times without interference with each other.

Still another object of this invention is to provide apparatus for directionally orienting loaves of bread on a conveying surface and for maintaining such orientation during movement of the loaves relative to the conveying surface.

The foregoing and other objects are accomplished according to one embodiment of this invention by installing in a bakery a large rotatable annulus, the surface of which is made up of radially directed oval rods. Warm loaves of bread are conveyed from the oven to the inner side of the annulus and then transferred by a shifting vane onto the inner peripheral portion of the conveying surface of the annulus.

After a loaf has passed substantially around the axis of the annulus, it is shifted outwardly by another shifting vane to an annular zone of greater radius. Then, after passing about the axis again, the loaf is shifted automatically by another vane, and so on, until the bread has had time to cool properly. The loaves are removed from the annulus by still another shifting vane which transfers them from an outer peripheral zone of the annulus onto a discharge conveyer. The discharge conveyer may take the loaves to the bread wrapping equipment of the bakery.

A better understanding of this invention and its many objects and advantages will be gained from a consideration of the following detailed description of an embodiment thereof illustrated in the accompanying drawings, in which:

Fig. 1 is a diagrammatic plan view illustrating the overall system of this invention;

Fig. 2 is a vertical cross sectional view of a small portion of the surface of the annular bread cooler of Fig. 1, showing a portion of a loaf of bread thereon;

Fig. 3 is a plan view of that portion of the bread cooler of this invention in which the shifting vane mechanism is located, with the loaf-supporting rods being omitted;

Fig. 4 is a vertical cross sectional view of Fig. 3; and

Fig. 5 is an elevational view showing the portion of the cooler illustrated in Fig. 3, as viewed from the center portion of the annulus.

Referring more specifically to Fig. 1, it will be evident that no attempt has been made to disclose any particular type of oven. The present invention is not restricted in any way to the structure of the oven employed.

The freshly baked, still warm, loaves 2 of bread are placed upon a conveyer 4 of any suitable construction. The conveyer 4 has been illustrated as a belt conveyer, but it will be obvious to persons skilled in the art that other forms of endless conveyers may be used if desired. Its purpose is to convey the loaves from the vicinity of the oven to the inner periphery of a large annulus designated generally by the numeral 6.

The structure of the annulus 6 will be described in more detail with reference to the other figures of the drawings. However, it is pointed out here that the annulus is mounted for rotation about its central axis, and is rotated by means of a motor 8, a pulley 10 driven by the motor, and a rope 12 encircling both the pulley 10 and the outer periphery of the annulus 6 and serving to transmit rotary motion from the pulley 10 to the annulus.

As each loaf 2 on the conveyer 4 reaches the inner periphery of the annulus 6, it is transferred from the conveyer 4 onto the inner peripheral zone of the annulus 6 by a shifting vane mechanism designated generally by the numeral 14 in Fig. 1. Thus, in time the inner peripheral zone of the annulus 6 becomes completely filled with loaves of bread, as suggested by the broken line to which the numeral 16 is applied.

After each loaf to be placed upon the inner peripheral zone of the annulus 6 has made substantially one complete revolution about the axis and again arrives at the shifting vane mechanism 14, it is moved radially relative to the annulus by the vane mechanism to position it in a second circumferentially extending zone of the annulus. When the second zone becomes filled completely with loaves, as indicated by the broken line bearing the numeral 18, the loaves will be transferred successively by the vane mechanism 14 to still another or third zone. Eventually, the entire surface of the annulus 6 becomes filled with loaves which move slowly about the axis of the annulus. It will be understood that the number of revolutions of the loaves about the axis of the annulus 6 is a matter of choice, depending upon the cooling time required.

After the loaves have made a sufficient number of passes about the axis of the annulus 6 to give them time to cool properly, they are transferred by the vane mechanism 14 from the outer periphery of the annulus 6 onto a discharge conveyer 20 which may feed them to the conventional wrapping machinery.

It may be helpful at this point to suggest, as an example, the size and speed of a suitable annular bread cooler. The annulus 6 may have an outside diameter of ninety feet, an inside diameter of seventy feet, and a speed of one-ninth of a revolution per minute. With such an arrangement each loaf of bread may travel approximately 2,135 feet in a period of approximately 65 minutes.

In spite of the long path traversed by each of the loaves of bread, the overall dimensions of the annular cooler represent a significant improvement over the systems heretofore devised. Moreover, it should be noted that the system has only a few units, and these are not complex. Hence, the cost of installation and the cost of maintenance of the system of this invention are substantially less than those associated with any of the atuomatic bread coolers heretofore devised.

Fig. 2 of the drawings shows the relationship between the supporting elements of the annulus 6 and a loaf of bread thereon. The supporting elements are radially extending rods 22 of oval cross section. The long axis of the oval representing the width of the cross section of each of the rods 22 is disposed in a generally horizontal plane. With this arrangement, the tendency of the rods 22 to dent or groove the bottom surfaces of the still warm and pliable loaves 2 is reduced. Nevertheless, shallow grooves, such as those indicated at 24 in Fig. 2, are formed by the rods 22. These shallow grooves cooperate with the rods to guide the loaves in their lateral shifting movements across the annulus 6, but they are not of sufficient depth to detract from the appearance of the loaves.

The structure of the annulus 6 and the structure of the shifting vane mechanism 14 will be evident from a consideration of Figs. 3, 4, and 5 of the drawings. The annulus 6 is supported upon a pair of circular tracks 26 which may be secured to any convenient support surface in the bakery. Usually, such support surface would be either a floor or perhaps the roof of the building.

Cooperating with the tracks 26 are a plurality of grooved wheels 28 which are freely rotatable on spindles 30 carried by brackets 32. The upper ends of the brackets 32 are attached, as by welding, to the radially extending braces 34. The braces 34 are spaced regularly about the axis of the annulus 6 and are connected together by a plurality of rod-supporting members 36 and 38 of suitable cross sectional shapes.

The members 36 and 38 may be short, straight members, or they may be elongated, arcuate members. The choice depends largely upon the equipment available to the builder of the system. In any event, it will be understood that the total assembly of braces 34 and supporting members 36 and 38 forms an annular body, as shown in Fig. 1. The upper surface of this annular body is formed by the radially extending oval rods or guides 22 disposed as indicated in Fig. 2 and secured, as by welding, to the supporting members 36 and 38.

The peripheries of the annular body are formed by arcuate plates 40 and 42 secured in any convenient manner to the braces 34 and the supporting members 38. The plates 40 and 42 also may be secured to the brackets 32 for the grooved rollers 28 so as to contribute to the support of such rollers. The driving rope 12 frictionally engages the surface of the outer peripheral plate 42. To facilitate this cooperation the plate 42 may be provided with a shallow groove 44 in which the rope 12 may ride.

The conveyer 4 which delivers the loaves from the oven to the annulus 6 passes over or beneath the annulus and then downwardly or upwardly so that its surface is at about the same level as the surface of the annulus 6 (Fig. 5). Of course, in passing beneath the annulus 6, it is necessary for the conveyer 4 to pass beneath the tracks 26, and this is arranged most conveniently by passing the conveyer through an opening in the floor which supports the tracks 26. The path of the conveyer 4 is established by the provision of a plurality of guide rollers 46 about which the conveyer may pass. Any one of these rollers may be driven or some other means may be provided for driving the conveyer belt 4. The speed of this conveyer belt is approximately the same as the speed of the inner periphery of the annulus 6.

The discharge conveyer 20 is similar in many respects to the feeding conveyer 4. However, the location of the discharge conveyer 20 adjacent the outer periphery of the annulus 6 makes it unnecessary for this conveyer to pass beneath the annulus 6. Also the speed of the discharge conveyer 20 is approximately the same as the speed of the outer periphery of the annulus 6.

The shifting vane mechanism 14 includes a first vane or guide 48 positioned above the feeding conveyer 4, a plurality of vanes or guides 50 disposed in spaced relation to each other above the upper surface of the annulus 6, and a discharge vane 52 adjacent the outer periphery of the annulus 6. The vanes or guides 48, 50 and 52 extend vertically and have upwardly extending end portions 54 which are secured, as by welding, to frame members 56 and 58.

The frame members 56 and 58 are pivotally supported upon crank pins 60 carried by rotatable members 62. The rotatable members 62 are secured to vertically extending shafts 64, 66, 68 and 70, adjacent the end portions of the frame members 56 and 58. These shafts are mounted for rotation in suitable frames or supports attached to the same surface which supports the tracks 26. In the drawings a very simple type of mounting 72 for the shaft 64 has been illustrated in the interest of clarity.

The shaft 64 has fixed thereon a pulley 74 which is connected by a drive belt 76 to a pulley 78 carried by a vertical shaft 80. The vertical shaft 80 also has fixed thereto a friction wheel 82 which bears against the plate 40 on the inner periphery of the annulus 6. As the annulus rotates, the friction wheel also rotates, and motion of the friction wheel 82 is transmitted to the vertical shaft 64 in a manner that will be obvious.

Each of the shafts 64, 66, 68 and 70 has fixed thereto a pulley 84 located above the annulus 6. These pulleys 84 are connected together for common rotation by a drive belt 86.

It will be evident that, during rotation of the annulus 6, the frame members 56 and 58, with the vanes 48, 50, and 52 depending therefrom, will oscillate under the influence of the crank pins 60. This movement is suggested in Fig. 3 by the broken line positions of the vanes 48, 50 and 52. These broken line positions represent the maximum radial displacement of the vanes from the full line positions thereof. The speed of this oscillating movement of the vanes is high as compared to the speed of advance of the loaves of bread along the surface of the annulus 6 so that a number of oscillations take place during the interval required for a loaf of bread to pass from the leading edge of a vane to its trailing edge. The timing is such that each loaf is contacted a plurality of times by a forwardly and laterally moving inclined surface to shift in laterally with a minimum twisting component.

In this connection, it is pointed out that a loaf of bread has a horizontal cross section which approximates a rectangle, one side of which is several times as long as the other side. This shape presents an orientation problem in the bread cooler of this invention. If the loaves are arranged on the annulus 6 so as to utilize the available space most efficiently, the directional orientation of the loaves must be preserved. Otherwise, the loaves will interfere with each other.

It will be understood that the illustrated mechanism for shifting the vanes of the mechanism 14 is merely an example of many which might be employed. In some instances, it may be found desirable to shift the vanes in a reciprocating path. Moreover, the path of the vanes need not contain a forward component of motion in all circumstances.

Another feature which contributes materially to the maintenance of the directional orientation of the loaves is the cooperation which is achieved between the bottom surfaces of the loaves and the oval rods 22. As explained above, shallow grooves 24 are formed in the bottom surfaces of the loaves as they are placed upon the rods 22 because the loaves are still soft at this time. These grooves 24 ride along the rods 22 as the loaves are shifted by the vanes 48, 50 and 52, and tend to maintain the established orientation of the loaves.

Since various alterations and modifications will be apparent to persons skilled in the art, it is intended that the foregoing detailed description of an embodiment of the invention should be considered as exemplary only. The scope of the invention is to be ascertained from the following claims.

I claim:

1. Apparatus for cooling loaves of bread or the like, comprising a conveyer having a portion movable in a generally horizontal closed path, said portion having an upper surface which is a plurality of times as wide as one of the horizontal dimensions of a loaf of bread supported thereby, means for moving said portion along said path, a generally vertical vane mounted in spaced relation to the upper surface of said conveyer, the space between said vane and said upper surface being less than the height of one of the loaves, and means for moving said vane relative to said conveyer in a direction having a lateral component a plurality of times during the interval required for a loaf to pass said vane so that said vane repeatedly urges each loaf laterally of the conveyer to shift the loaf to a new path.

2. Apparatus for cooling loaves of bread or the like comprising a conveyer having a portion movable in a generally horizontal closed path, said portion having an upper surface which is a plurality of times as wide as one of the horizontal dimensions of a loaf of bread supported thereby, means for moving said portion along said path, a generally vertical vane mounted in spaced relation to said upper surface of said conveyer and in inclined relation to the direction in which the conveyer travels beneath it, the space between said vane and said surface being less than the height of one of said loaves so that said loaves contact said vane as they move along said conveyer, and means for moving said vane relative to said conveyer in a direction having a lateral component a plurality of times during the interval required for a loaf to pass said vane so that an inclined surface of said vane repeatedly urges each loaf laterally of the conveyer to shift the loaf to a new path without materially altering the established directional orientation of the loaf on the conveyer.

3. Apparatus for cooling loaves of bread or the like, comprising a rotary conveyer mounted for rotation about a generally vertical axis and having an upper surface upon which the loaves of bread may rest, the radial extent of said upper surface being a plurality of times as large as the longest dimension of one of said loaves, a generally vertical guide mounted in spaced relation to the upper surface of said conveyer and in inclined relation to the direction of movement of the portion of the conveyer therebeneath, the space between said guide and said surface being less than the height of one of said loaves so that said loaves contact said guide as they move along said portion of the conveyer, the inclination of said guide being such that the leading edge thereof is displaced from the trailing edge thereof a radial distance greater than the largest dimension of one of said loaves, means for rotating said conveyer, and means for moving said guide relative to said conveyer in a direction having a radial component a plurality of times during the interval required for a loaf to pass said guide so that an inclined surface of said guide repeatedly urges each loaf radially of the rotary conveyer to shift the loaf to a new circular path without materially disrupting the established directional orientation of the loaf on the conveyer.

4. Apparatus for cooling loaves of bread or the like, comprising a rotary conveyer mounted for rotation about a generially vertical axis and having an upper surface upon which the loaves of bread may rest, the radial extent of said upper surface being a plurality of times as large as the longest dimension of one of said loaves, a generally vertical guide mounted in spaced relation to the upper surface of said conveyer and in inclined relation to the direction of movement of the portion of the conveyer therebeneath, the space between said guide and said surface being less than the height of one of said loaves so that said loaves contact said guide as they move along said portion of the conveyer, the inclination of said guide being such that the leading edge thereof is displaced from the trailing edge thereof a radial distance greater than the longest dimension of one of said loaves, means for rotating said conveyer, and means for moving said guide relative to said conveyer in a path a portion of which has both a radial component extending in the direction of inclination of the trailing edge of said guide and a component extending in the direction of movement of the conveyer therebeneath, the last-mentioned means operating to move said guide through said portion of its path a plurality of times during the interval required for a loaf to pass said guide so that an inclined surface of said guide repeatedly urges each loaf radially of the rotary conveyer to shift the loaf to a new circular path without materially disrupting the established directional orientation of the loaf on the conveyer.

5. The combination which comprises an annulus mounted for rotation about a vertical axis located at its center and having an upper surface upon which articles of a predetermined size may rest, means for rotating said annulus, first conveyer means having an article supporting surface a portion of which is located adjacent to and at about the same level as the inner periphery of said annulus, means for driving said first conveyer means so as to cause said portion of said surface to move substantially in the same direction and at the same speed as the inner periphery of said annulus, a first generally vertical vane disposed above said portion of the surface of said conveyer means a distance less than the height of said articles and being inclined toward the inner periphery of said annulus in the direction of movement of said portion, a second generally vertical vane disposed above an inner peripheral zone of said annulus a distance less than the height of said articles and being inclined toward the outer periphery of said annulus in the direction of movement of said annulus, said first and second vanes being connected together in spaced relation to permit the passage of said articles therebetween, and means for moving said vanes in a direction having a radial component a plurality of times during the interval required for an article to pass said vanes so that said first vane shifts articles from said conveyer means onto said annulus and said second vane shifts articles which have substantially completed one revolution about the axis of the annulus to another zone of said annulus of greater radius.

6. The combination which comprises an annulus mounted for rotation about a vertical axis located at its center and having an upper surface upon which articles of a predetermined size may rest, means for rotating said annulus, conveyer means having an article supporting surface a portion of which is located adjacent to and at about the same level as the inner periphery of said annulus, means for driving said conveyer means so as to cause said portion of said surface to move substantially in the same direction and at the same speed as the inner periphery of said annulus, a first generally vertical vane disposed above said portion of the surface of said conveyer means a distance less than the height of said articles and being inclined toward the inner periphery of said annulus in the direction of movement of said portion, a second generally vertical vane disposed above an inner peripheral zone of said annulus a distance less than the height of said articles and being inclined toward the outer periphery of said annulus in the direction of movement of said annulus, frame means connecting said vanes together in spaced relation to permit the passage of said articles therebetween, and means for ocillating said frame means about an axis while maintaining the inclination of said vanes substantially constant, the last-mentioned means oscillating said frame means a plurality of times during the interval required for an article to pass said vanes so that said first vane shifts articles from said conveyer means onto said annulus and said second vane shifts articles which have substantially completed one revolution about the axis of the annulus to another zone of said annulus of greater radius.

7. The combination which comprises an annulus mounted for rotation about a vertical axis located at its center and having an upper surface upon which articles of a predetermined size may rest, means for rotating said annulus, first conveyor means having an article supporting surface a portion of which is located adjacent to and at about the same level as the inner perpihery of said annulus, means for driving said first conveyer means so as to cause said portion of its surface to move substantially in the same direction and at the same speed as the inner periphery of said annulus, second conveyer means having an article supporting surface a portion of which is located adjacent to and at about the same level as the outer periphery of said annulus, means for driving said second conveyer means so as to cause said portion of its surface to move substantially in the same direction and at the same speed as the outer periphery of said annulus, a first generally vertical vane disposed above said portion of the surface of said first conveyer means a distance less than the height of said articles and being inclined toward the inner periphery of said annulus in the direction of movement of said portion, a second generally vertical vane disposed above an inner peripheral zone of said annulus a distance less than the height of said articles and being inclined toward the outer periphery of said annulus in the direction of movement of said annulus, a third generally vertical vane disposed above an outer peripheral zone of said annulus opposite said portion of said second conveyer means a distance less than the height of said articles and being inclined toward the outer periphery of the annulus in the direction of movement of the annulus, and means for moving said vanes in a direction having a radial component a plurality of times during the interval required for an article to pass said vanes so that said first vane shifts articles from said first conveyer means onto said annulus and said second vane shifts articles which have substantially completed one revolution about the axis of the annulus to another zone of said annulus of greater radius, and said third vane shifts articles from the outer periphery of said annulus onto said second conveyer means.

8. In a bakery having an oven for baking loaves of bread or the like, the improvement which comprises a bread cooler adapted to receive the freshly baked loaves of bread, said bread cooler including a conveyer mounted for movement along an endless horizontal path and having a plurality of elongated, spaced apart, transversely extending, horizontal rods at its upper surface, said rods having smooth upper surfaces unobstructed throughout their lengths for supporting the loaves of bread and being so spaced from each other that each loaf rests upon a plurality of said rods, means for moving said conveyer along said path, and means for engaging each loaf and sliding it longitudinally in one direction along the said rods supporting such loaf once during each pass of the conveyer about said path.

9. In a bakery having an oven for baking loaves of bread or the like, the improvement which comprises a bread cooler adapted to receive the freshly baked loaves of bread, said bread cooler including a rotatable annulus mounted for rotation in a horizontal plane and having a plurality of elongated, spaced apart, radially extending, horizontal rods at its upper surface, said rods having smooth upper surfaces unobstructed throughout their lengths for supporting the loaves of bread and being so spaced from each other that each loaf rests upon a plurality of said rods, means for rotating said annulus, and a vertical guide mounted above and in spaced relation to the upper surfaces of the rods and being inclined with respect to the direction of movement of the rods therebeneath so as to contact each loaf and slide it radially along the rods supporting such loaf.

References Cited in the file of this patent

UNITED STATES PATENTS

| 1,100,645 | Barber | June 16, 1914 |
| 2,338,348 | Newman | Jan. 4, 1944 |
| 2,758,391 | Lanham | Sept. 16, 1955 |

FOREIGN PATENTS

| 118,394 | Great Britain | Aug. 29, 1918 |